(12) United States Patent
Sato et al.

(10) Patent No.: US 6,302,149 B1
(45) Date of Patent: Oct. 16, 2001

(54) SOLENOID-VALVE MANIFOLD WITH FEEDING MECHANISM

(75) Inventors: Hideharu Sato; Takumi Matsumoto, both of Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/668,290

(22) Filed: Sep. 25, 2000

(30) Foreign Application Priority Data

Oct. 18, 1999 (JP) .................................................. 11-295976

(51) Int. Cl.$^7$ ...................................................... F16K 11/10

(52) U.S. Cl. .......................................... 137/884; 137/269

(58) Field of Search ..................................... 137/884, 269

(56) References Cited

U.S. PATENT DOCUMENTS 4,815,496 * 3/1989 Nishitani et al. ..................... 137/884
4,938,258 * 7/1990 Sato .................................... 137/884

FOREIGN PATENT DOCUMENTS 7-22540   5/1995   (JP) .

* cited by examiner

*Primary Examiner*—John Fox
(74) *Attorney, Agent, or Firm*—Oblon, Spivak, McClelland, Maier & Neustadt, P.C.

(57) ABSTRACT

A solenoid-valve manifold having a highly convenient feeding mechanism in which a connector for connecting to a power supply and each solenoid valve can be easily connected together and a connection structure can be easily changed in accordance with an increase or decrease in the number of the solenoid valves. For this purpose, a plurality of manifold blocks having two upper and lower fixing grooves at front and rear surfaces thereof are detachably connected together, and a connector holder is fixed to the fixing grooves in such a manner that the fixing position can be freely adjusted. Further, a multipolar connector for connecting to an external power source is attached to the connector holder, a connector base plate having a plurality of distributing connector corresponding to each of the solenoid valves is also attached to the connector holder, and the distribution connectors are each connected to a power-receiving connector of the solenoid valve with a splicer.

6 Claims, 2 Drawing Sheets

SOLENOID-VALVE MANIFOLD WITH FEEDING MECHANISM

TECHNICAL FIELD

The present invention relates to a solenoid-valve manifold in which each of a plurality of manifold blocks connected together has a solenoid valve mounted thereon and having a feeding mechanism for feeding electrical power to the solenoid valves.

BACKGROUND ART

A solenoid-valve manifold in which a plurality of manifold blocks, each having a valve-mounting surface for mounting a solenoid valve and a channel for supplying the solenoid valve with a pressure fluid, are connected together, and in which the manifold blocks each have the solenoid valve mounted thereon, is already well known. Such a solenoid-valve manifold has a feeding mechanism for supplying the solenoid valves with electrical power.

In general, in the conventional feeding mechanism, a manifold-block connecting body has a terminal block attached to a connecting end thereof, and a multipolar connector for connecting to an external power source is fixed to the terminal block, and then the multipolar connector and each solenoid valve are directly connected using a lead wire or are connected via a relay connector.

In the conventional feeding mechanism, however, since the multipolar connector is located at one end of the solenoid-valve manifold, a number of lead wires must be led out from the multipolar connector in one direction. Consequently, in the case where a number of solenoid valves are connected together, the number of lead wires also increases, as a result, a wiring operation is complicated such that not only are the lead wires intertwined but also long lead wires are required for connecting to a solenoid valve separated from the connector. Moreover, changing the connection or the like in the case of increasing or decreasing the number of solenoid valves or rearranging them is extremely troublesome.

DISCLOSURE OF THE INVENTION

It is a technical object of the present invention to provide a solenoid-valve manifold having a highly convenient feeding mechanism in which a connector for connecting to a power source and each solenoid valve can be easily connected together and in which the connection structure can be easily changed in accordance with the increase or decrease in the number of the solenoid valves.

In order to attain the above object according to the present invention, there is provided a solenoid-valve manifold having a feeding mechanism characterized by comprising: a plurality of manifold blocks each having a valve-mounting surface for mounting the solenoid valve and a channel for supplying a pressure fluid to the mounted solenoid valve, which are detachably connected together; one or a plurality of fixing grooves provided on at least one of front and rear surfaces of each manifold block, which extend in a connecting direction, and which are connected to the fixing groove of the adjacent manifold block; a solenoid valve mounted on the valve-mounting surface of each of the manifold blocks; a power-receiving connector provided for each of the solenoid valves; a connector holder fixed to the fixing groove of the manifold blocks along the fixing groove in such a manner that the fixing position can be freely adjusted; a multipolar connector provided for the connector holder for connecting to an external power source; a plurality of distributing connectors provided for the connector holder and connected to the multipolar connector, which correspond to the plurality of solenoid valves; and a splicer for electrically connecting each of the distributing connectors to the power-receiving connector of the solenoid valve.

In the solenoid-valve manifold having the above construction, since the connector holder can be moved along the fixing groove and fixed to any location where wiring can be easily performed depending on the number of the solenoid valves and the like, it is highly convenient because not only is the wiring operation remarkably simplified, but also a connection structure can be easily changed in accordance with an increase or decrease in the number of the solenoid valves.

According to a preferred embodiment of the present invention, the plurality of distributing connectors are mounted on one connector base plate, and the connector base plate is removably attached to the connector holder. The connector holder is constructed so as to allow the connector base plate to be installed in a state where part of the connector base plate is protruded from the side-end surface thereof. The connector holder can have an auxiliary case covering the protruded portion of the connector base plate and an end cover for closing an open end of the auxiliary case connected thereto.

According to the embodiment of the invention, the fixing groove provided for each manifold block has an extended section having a large groove width therein, and fixing screws each having a nut attached at a tip thereof are attached to the connector holder and the end cover at positions corresponding to the fixing groove in a manner so as to be freely fastened or loosened. By inserting the nuts into the extended section of the fixing groove via a groove end and by tightening the fixing screws, the connector holder and the end cover are fixed to the fixing groove.

With the above construction, mounting of the connector holder and the end cover to the fixing groove and adjustment of the positions thereof can be remarkably easily performed.

DETAILED DESCRIPTION

Figure 1:
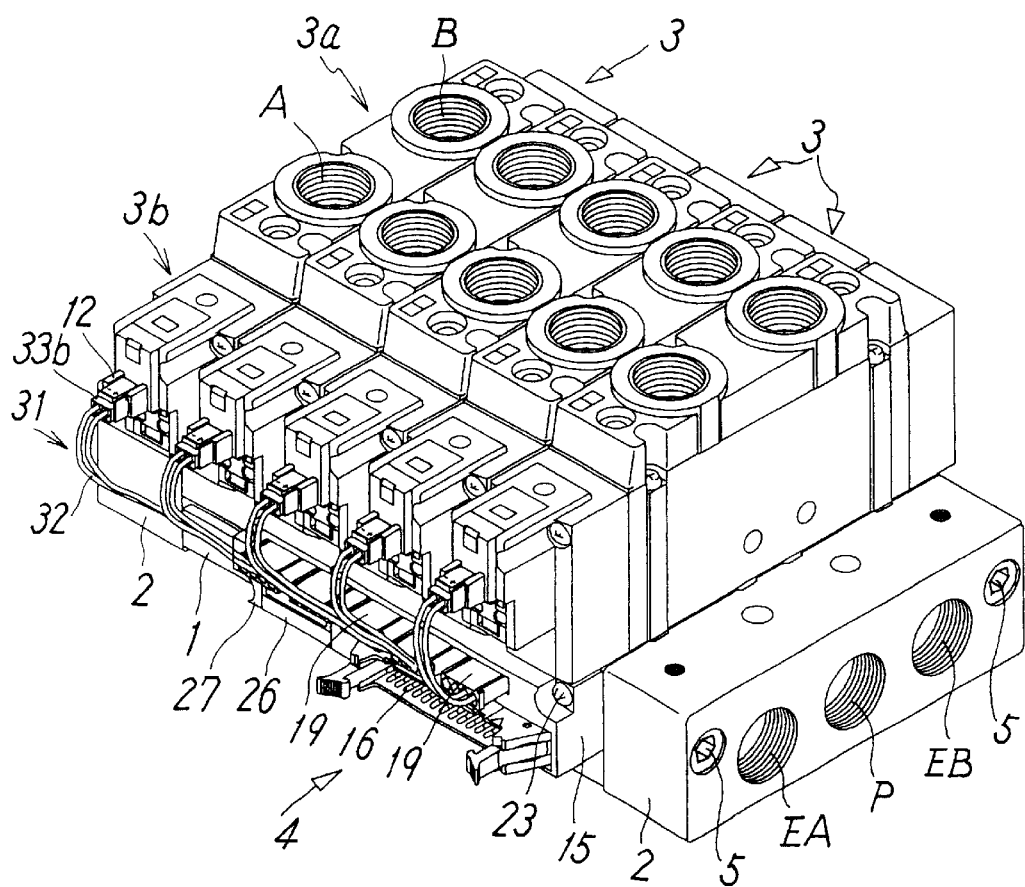
FIG. 1 is a perspective view of a solenoid-valve manifold according to the present invention.
Figure 2:
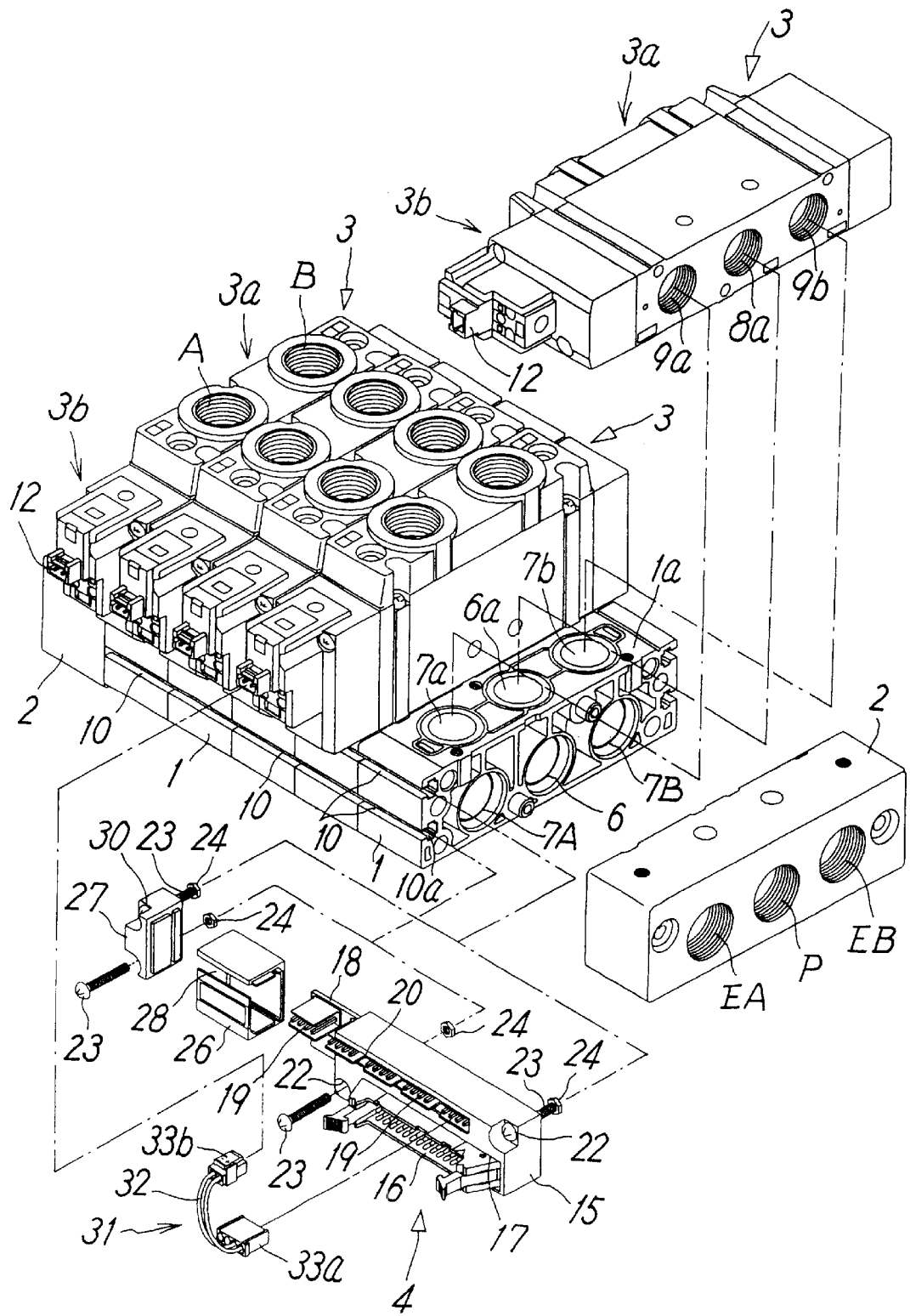
FIG. 2 is an exploded view of FIG. 1.

FIG. 1 and FIG. 2 illustrate a preferred embodiment of a solenoid-valve manifold according to the present invention. The solenoid-valve manifold has a plurality of manifold blocks 1 detachably connected together, two end blocks 2 and 2 for fixing the manifold blocks 1 by sandwiching them from both sides, solenoid valves 3 each mounted on the manifold block 1, and a feeding mechanism 4 for supplying each of the solenoid valves 3 with electrical power.

The manifold blocks 1 are a modular type divided for each solenoid valve 3 and each have a valve-mounting surface 1a for mounting the solenoid valve 3, a supply channel 6 for supplying the mounted solenoid valve 3 with a pressure fluid such as compressed air, and exhaust channels 7A and 7B for conducting the pressure fluid from the solenoid valve 3 to the exterior. The supply channel 6 and the exhaust channels 7A and 7B bore through the manifold blocks 1 in a connecting direction to be connected to each channel of the adjacent manifold blocks 1, and are each connected to a supply port P and exhaust ports EA and EB. The supply channel 6 and the exhaust channels 7A and 7B are each connected to a supply hole 6a and exhaust holes 7a and 7b, which are opened in the valve-mounting surface 1a. When the solenoid valve 3 is mounted on the valve-mounting surface 1a, the supply channel 6 and the exhaust channels 7A and 7B are each connected to a supply hole 8a and exhaust holes 9a and 9b of the solenoid valve 3.

In addition, the manifold blocks 1 each have two fixing grooves 10 extending in the block-connecting direction formed on both of front and rear end surfaces thereof, wherein the fixing grooves 10 and 10 are each connected to the corresponding fixing grooves 10 and 10 of the adjacent manifold blocks 1. These fixing grooves 10 each have an extended section 1a having a large groove width therein.

One or both of the end blocks 2 have the supply port P and the exhaust ports EA and EB in order to also serve as piping blocks. The two end blocks 2 and 2 and the manifold blocks 1 sandwiched by them are fixed together using a plurality of bolts 5 boring through them. However, the end blocks 2 and 2 and the manifold blocks 1 can be also grouped together by mounting on a rail.

In addition, the solenoid valve 3 comprises a main valve section 3a having therein valve members for switching the channels and a solenoid section 3b for driving the valve members, wherein the main valve section 3a has the supply hole 8a and the exhaust holes 9a and 9b provided at the bottom surface thereof, and has two output ports A and B provided at the top surface thereof. The solenoid section 3b has a power-receiving connector 12 for receiving electrical power from the feeding mechanism 4.

The feeding mechanism 4 includes a connector holder 15 fixed to the two fixing grooves 10 and 10 of the manifold blocks 1 in such a manner that the fixing position can be freely adjusted. The connector holder 15 has a rectangular shape that is long in a direction of the fixing groove 10, and has at a lower front portion thereof a concave section 17 for detachably mounting a multipolar connector 16 from the front surface side thereof for connecting to a power source, while at a rear side of the multipolar connector 16, there is provided an inserting hole (not shown) opened from one end-side surface of the holder 15, the hole for inserting a connector base plate 18 having a plurality of distributing connectors 19 each corresponding to the solenoid valve 3. At a front upper portion of the connector holder 15, there is provided a window hole 20 for conducting the distributing connectors 19 on the connector base plate 18. In this case, the connector holder 15 is preferably constructed to allow contacts of the multipolar connector 16 and contacts of the distributing connectors 19 on the connector base plate 18 to be each automatically connected together, when the multipolar connector 16 is inserted into the concave section 17 after the connector base plate 18 has been inserted into the inserting hole.

In order to fix the connector holder 15 to the fixing grooves 10 and 10, the connector holder 15 has fixing holes 22 each formed at an upper corner on one end and a lower corner on another end thereof in a longitudinal direction. Fixing screws 23 are inserted into the fixing holes 22 and 22 corresponding to the upper and lower fixing grooves 10 and 10, and are screwed into nuts 24 inserted to the extended sections 10a of the upper and lower fixing grooves 10, respectively. Consequently, the connector holder 15 is fixed to the fixing grooves 10. In this case, by inserting fixing screws 23 and the nuts 24 into the fixing grooves 10 and the extended sections 10a via a groove end in a state where the nuts 24 are each loosely attached to a tip of the fixing screw 23, and by tightening the fixing screws 23 after the connector holder 15 has been moved to a predetermined position, the connector holder 15 can be easily mounted at any required position.

The connector base plate 18 is mounted to the connector holder 15 in a state where part thereof is protruded from the side end surface thereof. In order to cover the protruded portion of the connector base plate 18, the connector holder 15 has an auxiliary case 26 and an end cover 27 connected to the side end surface thereof.

The auxiliary case 26 has a short cylinder shape having the same shape and the same size in cross section as the connector holder 15, and includes a window hole 28 for conducting the distributing connectors 19 at the front surface, and is secured by being sandwiched between the connector holder 15 and the end cover 27.

On the other hand, the end cover 27 is used to close the open end of the auxiliary case 26, and has two fixing holes 30 at the upper and lower portions thereof, and is secured to the fixing grooves 10 using the fixing screws 23 and the nuts 24 in a manner similar to the connector holder 15.

The distributing connectors 19 the power-receiving connectors 12 of the solenoid valves 3 are each electrically connected together by splicers 31. The splicer 31 is configured by attaching a first socket 33a for connecting to the distributing connector 19 and a second socket 33b for connecting to a power-receiving connector 12 of the solenoid valve 3 to opposite ends of lead wires 32.

In the solenoid-valve manifold with the above construction, when the numbers of the manifold blocks 1 and the solenoid valves 3 are increased or decreased, it is desirable that after one end block 2 has been detached, and the feeding mechanism 4 has been detached, and then the numbers of the manifold blocks 1 and the solenoid valves 3 have been adjusted, the feeding mechanism 4 is fixed to a required position of the fixing grooves 10 and 10 on the manifold blocks 1 as described above, and then the end blocks 2 are mounted to connect them all together. In this case, in order to match the number of the increased or decreased solenoid valves 3 and the number of the distributing connectors 19, the connector base plate 18 can be replaced by one on which the distributing connectors 19 of the number corresponding to the solenoid valves 3 are mounted. In this instance, the multipolar connector 16 can be replaced by one appropriate to it. In addition, when a long connector base plate 18 is provided, in which a number of distributing connectors 19 are mounted, since a portion protruded from the connector holder 15 is long, the auxiliary case 26 is desirably replaced by a long one.

In addition, in the embodiment as shown in the drawings, since single-solenoid-type solenoid valves each having one solenoid section 3b as the solenoid valves 3 are used, the feeding mechanism 4 is provided only at one end of the manifold blocks 1. However, when double-solenoid-type solenoid valves 3 each having two solenoid sections at opposite ends of the main valve section 3a are used, the above-mentioned feeding mechanism 4 can be mounted on both of front and rear sides of the manifold blocks 1. Or wiring can be also provided for the solenoid section 3b on one end of the double-solenoid-type solenoid valves 3 from the feeding mechanism 4 mounted at the opposite end of the manifold blocks 1.

Furthermore, the manifold blocks 1 having the fixing grooves 10 and 10 only at either one of the front and rear surfaces thereof can be used.

Furthermore, the manifold blocks 1 are not necessarily constructed to allow part of the connector base plate 18 to be mounted in a state of being protruded therefrom, but may be constructed in a nonprotruding state, or may be constructed to allow the distributing connectors 19 to be mounted in other appropriate manners. In these cases, there is no need to provide the auxiliary case 26 and the end cover 27.

In addition, at each of the front and rear surfaces of the manifold blocks 1, although there are provided the two fixing grooves 10 for fixing the connector holder 15, the number of the fixing grooves may be one or three or more. When the three or more fixing grooves are provided, any one or two grooves can be used to fix the connector holder.

According to the present invention as described above, there is provided the solenoid-valve manifold having the highly convenient feeding mechanism in which the connector for connecting to power supply and each solenoid valve can be easily connected together and in which the connection structure can be easily changed in accordance with the increase or decrease in the number of the solenoid valves.

What is claimed is:

1. A solenoid-valve manifold with a feeding mechanism, comprising:

a plurality of manifold blocks each having a valve-mounting surface configured to mount a solenoid valve and having a channel configured to supply the mounted solenoid valve with a pressure fluid, said manifold blocks being detachably connected to each other;

at least one fixing groove provided on at least one of front and rear surfaces of each of said manifold blocks, and which extend in a connecting direction and are connected to fixing grooves of adjacent manifold blocks;

a solenoid valve mounted on the valve-mounting surface of each of said manifold blocks;

a power-receiving connector provided for each of said solenoid valves;

a connector holder fixed to the at least one fixing groove of said manifold blocks along the at least one fixing groove in such a manner that the fixing position can be freely adjusted;

an multipolar connector provided for said connector holder and configured to connect to an external power source;

a plurality of distributing connectors provided for said connector holder and connected to said multipolar connector, and which correspond to said plurality of solenoid valves; and splicers configured to electrically connecting each of said distributing connectors to the power-receiving connector of the solenoid valve, wherein said plurality of distributing connectors are mounted on one connector base plate, and the connector base plate is detachably mounted at said connector holder, and wherein said connector holder has a concave section at a front lower half section thereof configured to fix said multipolar connector and has an inserting hole at a side thereof configured to insert said connector base plate therethrough, and also has a window hole at a front upper half section thereof for disposing the distributing connectors on said connector base plate.

2. A solenoid-valve manifold as in claim 1, wherein said connector holder is constructed to mount said connector base plate in a state of being protruded from a side end surface thereof, and wherein the connector holder can connect to the side end surface thereof an auxiliary case configured to cover the protruded portion of said connector base plate, and an end cover configured to close an open end of the auxiliary case.

3. A solenoid-valve manifold as in claim 2, wherein the at least one fixing groove provided for each of said manifold blocks has therein an extended section having a large groove width; fixing screws each having a nut at a tip thereof are attached to said connector holder and the end cover at positions corresponding to said at least one fixing groove in a manner of being freely fastened or loosened; and by inserting the nuts into the extended section of said at least one fixing groove from a groove end and by tightening the fixing screws, said connector holder and the end cover are fixed to the at least one fixing groove.

4. A solenoid-valve manifold as in claim 3, wherein the at least one fixing groove includes fixing grooves provided at upper and lower positions of each manifold block, and the two fixing screws are each attached to said connector holder and the end cover in such a manner that one corresponds to the upper fixing groove and another corresponds to the lower fixing groove.

5. A solenoid-valve manifold as in claim 1, wherein the at least one fixing groove provided for each of said manifold blocks has therein an extended section having a large groove width; fixing screws each having a nut at a tip thereof are attached to said connector holder at positions corresponding to said at least one fixing groove in a manner of being freely fastened or loosened; and by inserting the nuts into the extended section of said at least one fixing groove from a groove end and by tightening the fixing screws, said connector holder is fixed to the at least one fixing groove.

6. A solenoid-valve manifold as in claim 5, wherein the at least one fixing groove includes fixing grooves provided at upper and lower positions of each manifold block, and said two fixing screws are attached to said connector holder in such a manner that one corresponds to the upper fixing groove and another corresponds to the lower fixing groove.

* * * * *